Patented Jan. 17, 1939

2,144,556

UNITED STATES PATENT OFFICE 2,144,556

MONOAZO DYESTUFFS AND A PROCESS FOR THEIR MANUFACTURE

Walter Wehrli, Basel, Switzerland, assignor to the firm of Chemical Works Formerly Sandoz, Basel, Switzerland No Drawing. Application March 23, 1937, Serial No. 132,621. In Switzerland March 31, 1936

6 Claims. (Cl. 260—199)

The present invention relates to new valuable monoazo dyestuffs and to a process for their manufacture.

It has been found that valuable monoazo dyestuffs dyeing wool and silk brilliant orange to red shades can be obtained by coupling diazotized amines of the general formula

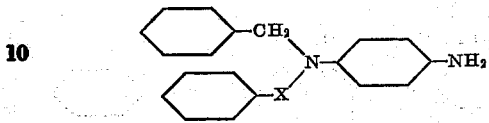

wherein X represents one of the group consisting of CO and SO₂ and herein all three benzene nuclei contain substituents selected from the group consisting of hydrogen, alkyl, alkoxy and halogen, with acylated aminonaphthol sulphonic acids of the general formula

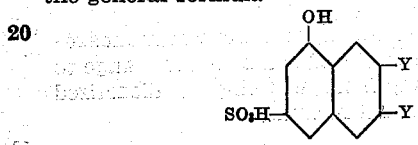

wherein one Y means the group

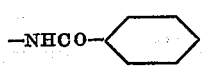

and the other Y means hydrogen, whereby the benzene nucleus contains substituents selected from the group consisting of hydrogen, alkyl, alkoxy and halogen.

The same dyestuffs may also be obtained by coupling the above cited diazotized bases with 2-amino-8-naphthol-6-sulphonic acid or 3-amino-8-naphthol-6-sulphonic acid and treating the dyestuffs thus obtained with halogenides of aromatic carboxylic acids in order to acylate the amino group.

The dyestuffs thus obtained dye animal fibres brilliant orange to red shades of excellent fastness properties. The dyeings on wool possess an especially good fastness to perspiration and to milling. The dyestuffs can advantageously be used for dyeing natural silk from a neutral bath, as the dye baths become completely exhausted without any addition of acids.

One object of the present invention is, therefore, the new valuable dyestuffs of the general formula

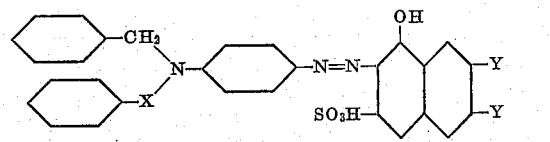

wherein X represents one of the group consisting of CO and SO₂ and one Y represents the group

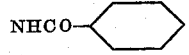

and the other Y means hydrogen, and wherein all four benzene nuclei contain substituents selected from the group consisting of hydrogen, alkyl, alkoxy and halogen, said dyestuffs dyeing wool and natural silk orange or red shades of excellent fastness properties.

Further objects will appear hereinafter.

The following examples, without being limitative, illustrate the present invention, the parts being by weight.

*Example 1*

35 parts of the base of the formula

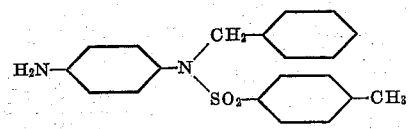

are diazotized with 6.9 parts of sodium nitrite and 25 parts of hydrochloric acid and coupled in presence of an excess of sodium acetate with 34.3 parts of 2-benzoyl-amino-8-naphthol-6-sulphonic acid. The coupling can also be carried out in presence of sodium bicarbonate or of a similarly acting neutralizing substance. The isolated dyestuff is in dry state a red powder, dyeing wool and silk red shades.

Instead of the base used in this example, other bases such as 4-p-toluenesulphonyl-benzylamino-3-methyl-1-amino-benzene or 4-p-toluenesulphonyl-benzylamino-3-methoxy-1-aminobenzene can be used, whereby dyestuffs of similar properties will be obtained. If instead of 2-benzoyl-amino-8-naphthol-6-sulphonic acid the 2(2'-chlorbenzoyl)-amino-8-naphthol-6-sulphonic acid is used, red dyeing dyestuffs of similar properties will be obtained.

Example 2

33.7 parts of the base of the formula

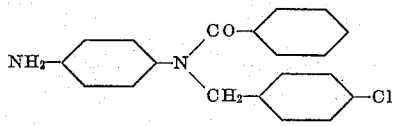

are diazotized with 6.9 parts of sodium nitrite and 25 parts of hydrochloric acid and coupled in presence of an excess of sodium acetate with 34.3 parts of 2-benzoylamino-8-naphthol-6-sulphonic acid. The isolated dyestuff is in dry state a red powder, dyeing wool and silk bluish red shades.

If in this example instead of 2-benzoylamino-8-naphthol-6-sulphonic acid the 2(2',5'-dichlorbenzoyl)-amino-8-naphthol-6-sulphonic acid is used, a dyestuff of similar properties will be obtained.

Example 3

30.2 parts of the base of the formula

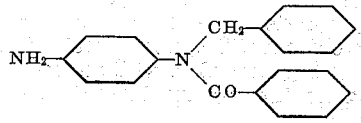

are diazotized with 6.9 parts of sodium nitrite and 25 parts of hydrochloric acid and coupled in presence of sodium bicarbonate with 34.3 parts of 3-benzoylamino-8-naphthol-6-sulphonic acid. The isolated dyestuff is in dry state a red powder, dyeing wool and silk orange shades.

If instead of the 3-benzoylamino-8-naphthol-6-sulphonic acid in this example the 3(2'-chlorbenzoylamino)-8-naphthol-6-sulphonic acid is employed, an orange dyeing dyestuff of similar properties results.

Example 4

33.7 parts of the base of the formula

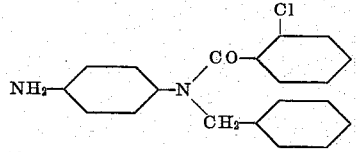

are diazotized with 6.9 parts of sodium nitrite and 25 parts of hydrochloric acid and coupled in presence of natrium bicarbonate with 34.3 parts of 2-benzoylamino-8-naphthol-6-sulphonic acid. The isolated dyestuff is in dry state a red powder, dyeing wool and silk red shades.

What I claim is:—

1. Monoazo-dyestuffs of the general formula

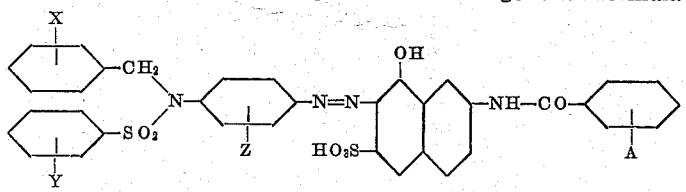

wherein X stands for one member of the group consisting of hydrogen and chlorine, Y stands for one member of the group consisting of hydrogen and methyl, Z stands for one member of the group consisting of hydrogen, methyl and methoxy, and A stands for one member of the group consisting of hydrogen and chlorine, said dyestuffs being red powders, yielding when dyed on animal fibres orange to red shades.

2. A water-soluble azo-dyestuff having the formula

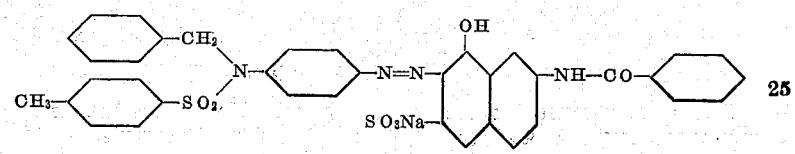

which is in dry state a red powder, dissolving in water and concentrated sulphuric acid with a red coloration and yielding, when dyed on animal fibre, red shades.

3. A water-soluble azo-dyestuff having the formula

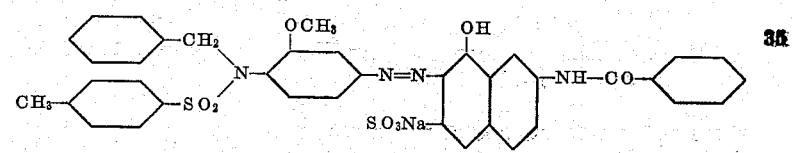

which is in dry state a red powder, dissolving in water with a red coloration and in concentrated sulphuric acid with a reddish-violet coloration, and yielding, when dyed on an animal fibre, red shades.

4. A process for the manufacture of monoazo-dyestuffs, dyeing wool and silk brilliant orange to red shades, comprising coupling a diazotized amine of the general formula

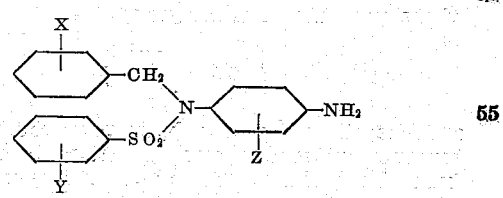

wherein X represents one member of the group consisting of hydrogen and chlorine, Y represents one member of the group consisting of hydrogen and methyl, and Z represents one member of the group consisting of hydrogen, methyl and methoxy, with a benzoylaminonaphtholsulphonic acid of the formula

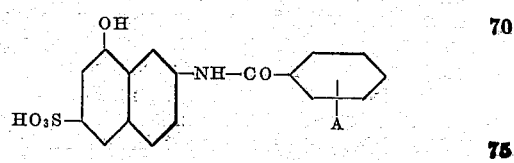

wherein A stands for one member of the group consisting of hydrogen and chlorine.

5. A process for the manufacture of a monoazo-dyestuff, consisting in coupling the diazo compound deriving from

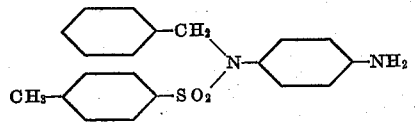

with benzoylaminonaphtholsulphonic acid of the formula

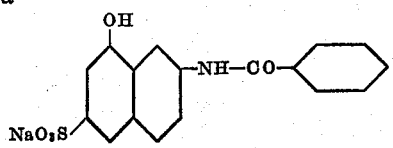

6. A process for the manufacture of a monoazo-dyestuff, consisting in coupling the diazo compound deriving from

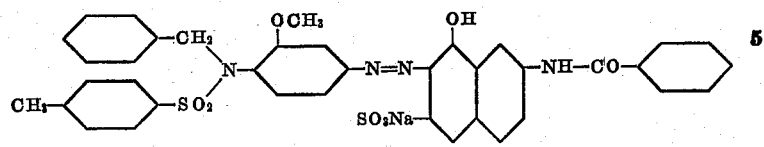

with benzoylaminonaphtholsulphonic acid of the formula

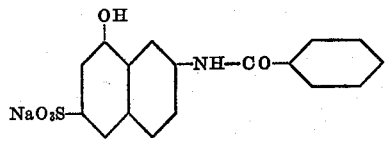

WALTER WEHRLI.